No. 721,582. PATENTED FEB. 24, 1903.
D. LUBIN.
AGRICULTURAL IMPLEMENT.
APPLICATION FILED JULY 28, 1902.
NO MODEL. 2 SHEETS—SHEET 2.

WITNESSES:
INVENTOR
David Lubin
ATTORNEYS.

UNITED STATES PATENT OFFICE.

DAVID LUBIN, OF NEW YORK, N. Y.

AGRICULTURAL IMPLEMENT.

SPECIFICATION forming part of Letters Patent No. 721,582, dated February 24, 1903.

Application filed July 28, 1902. Serial No. 117,307. (No model.)

*To all whom it may concern:*

Be it known that I, DAVID LUBIN, a citizen of the United States, and a resident of the city of New York, borough of Manhattan, in the county and State of New York, have invented a new and Improved Agricultural Implement, of which the following is a full, clear, and exact description.

This invention relates to improvements in agricultural implements operated by a motor carried on a vehicle; and the object is to provide a device of this character with the mechanism so arranged that the motor will alternately move the vehicle and operate the ground digging and pulverizing tools.

I will describe an agricultural implement embodying my invention and then point out the novel features in the appended claims.

Reference is to be had to the accompanying drawings, forming a part of this specification, in which similar characters of reference indicate corresponding parts in both the figures.

Figure 1:
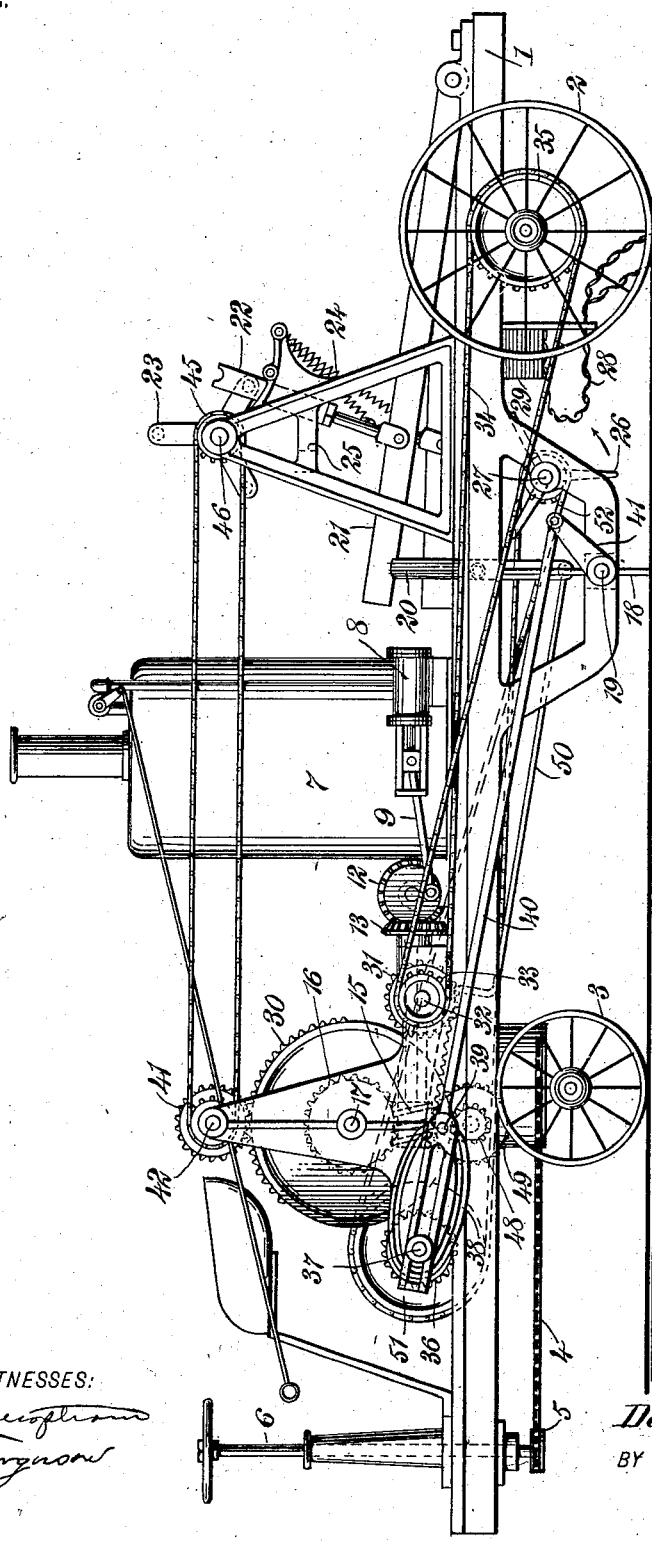
Figure 2:
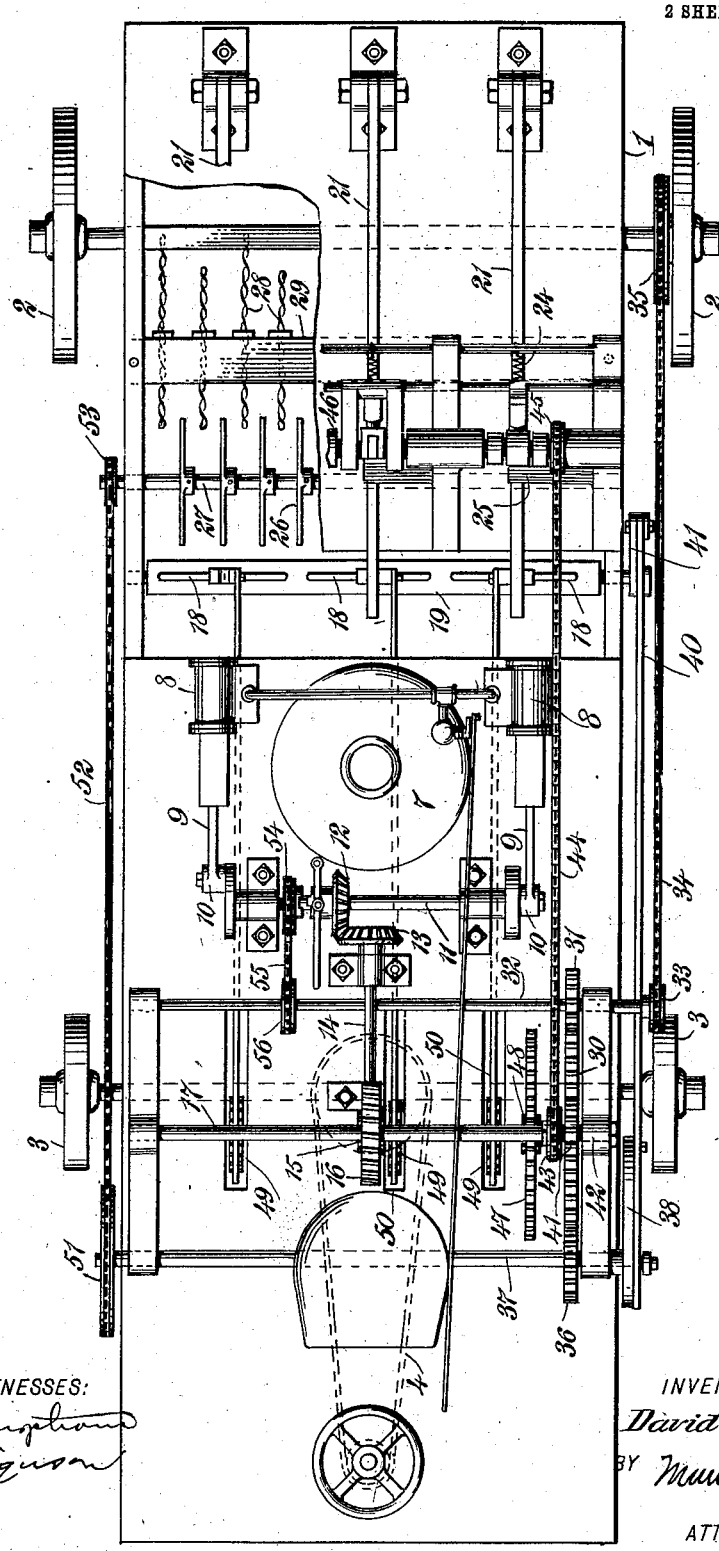

Figure 1 is a side elevation of an agricultural implement embodying my invention, and Fig. 2 is a plan view thereof.

The vehicle comprises a body or platform 1, mounted on the rear wheels 2 and the front wheels 3. The front wheels are designed to be employed also as steering-wheels, and therefore I have shown a sprocket-chain 4 extended from a sprocket-wheel on the front axle to a sprocket-pinion 5, attached to the lower end of a steering-rod 6.

Mounted on the vehicle is a motor, here shown as consisting of a boiler 7, supplying steam to the cylinders 8, the pistons in these cylinders having their stems 9 connected with the cranks 10 of a driving-shaft 11. On this driving-shaft 11 is a bevel-gear 12, which is movable lengthwise of the shaft, but is so connected thereto as to rotate with the shaft. The bevel-gear 12 meshes with a bevel-gear 13 on a worm-shaft 14, the worm 15 of which engages with a worm-wheel 16 on a counter-shaft 17.

Carried on the vehicle are digging-tools, here shown as forks 18, movable in a rock-shaft 19, having its bearings in the side portions of the platform 1. These digging tools or tines are designed to be forced into the ground vertically one after another, so that a motor of comparatively low horse-power may operate them.

Extended upward from each digging-tool is an arm 20, designed to be engaged with a push-lever 21. Extended upward from each push-lever is a push-bar 22, having a notch in its upper end in which a cam or crank 23 is designed to engage. As here shown, there are three digging-tools, and consequently three levers and three cranks, for engaging consecutively with the three push-rods. After forcing the digging-tool into the ground and when the push-rod 22 shall have been released by its cam or crank a spring 24 will move the lever to its uppermost or normal position, and the forward movement of the push-rod will be limited by a stop 25.

Arranged rearward of the digging-tools is a pulverizing or breaking device, consisting of fingers 26, extended from a shaft 27, and rearward of this rotary breaking device are leveling-fingers 28. These leveling-fingers are connected to a cross-bar 29 and extended slightly forward, then curved rearward, and then downward, so that their extreme ends will engage lightly on the soil and level or rake it. The forward portions of these devices 28 are in the line of movement of the digging-tools—that is, when the digging-tools move upward they will pass between the devices 28 and pulverize any dirt that may be carried thereby. Preferably these devices 28 are spirally twisted.

On the counter-shaft 17 is a mutilated gear 30, the teeth of which at a certain time are designed to engage with a pinion 31 on a driving-shaft 32. On the outer end of this shaft 32 is a sprocket-pinion 33, from which a chain 34 extends to a connection with a sprocket-wheel 35 on the rear axle. The teeth of this mutilated gear 30 are designated at a certain time to engage with a pinion 36 on a shaft 37, carrying a cam 38 on one end, the said cam being in the form of a slot-cam, and in the slot the wrist-pin 39 of a draw-bar 40 engages. This draw-bar at its rear end connects with a crank-arm 41 on the rock-shaft 19. At another time the teeth of said gear 30 are designed to engage with a pinion 41 on a shaft 42, and on this shaft 42 is a sprocket-pinion 43, from which a chain 44 extends to a connection with a sprocket-pinion 45 on the shaft 46, to which the cams 23 are connected. Also connected to the shaft 17 is a mutilated gear 47, designed to engage with a pinion 48, on the shaft of which a series of gear-wheels 49 is mounted. These gear-wheels 49 connect with rack portions formed on draw-rods 50, the rear ends of which are connected to the digging-tools. On one end of the shaft 37 is a sprocket-wheel 51, and this sprocket-wheel 51 is connected by a chain 52 with a sprocket-pinion 53 on the shaft 27.

Loosely mounted on the shaft 11 is a sprocket-pinion 54, having a clutch member on one side designed to be engaged by a clutch member carried by the gear 12, and this pinion 54 has a chain connection 55 with a sprocket-pinion 56, attached to the shaft 32. This mechanism is for driving the vehicle forward or from field to field when it is not desired to operate it in cultivating the ground.

In the operation when the vehicle is at a standstill the teeth of the gear 30 will first engage with the gear-wheel 41, which will cause a rotary movement of the cams 23 to force the digging-tools into the ground one after the other, as before mentioned. The teeth of the gear 30 after leaving the wheel 41 will engage with the gear 36, which by operating the cam 38 will cause the digging-tools to swing upward with a load of earth, and at this same time the rotary breaking devices 26 will be set in rapid rotation, so as to finely pulverize the earth lifted between them by the digging-tools. After moving out of engagement with the gear 36 the teeth of the gear 47 will engage with the small pinion 48, causing a rapid rotation of the shaft carrying the gear-wheels 49, and these gear-wheels meshing with the racks of the draw-rods 50 will draw the digging-tools back to their normal position or with the ends of their tines close to the lower side of the rock-shaft 19, so that the cam 38 on its reverse motion will move the digging-tools to vertical position to be again operated. The teeth of the gear 30 will now engage with the pinion 31 and cause the vehicle to move forward a sufficient distance for the next operation of the digging-tools, and the operation of course will continue in this alternate fashion from one side of a field to the other.

Having thus described my invention, I claim as new and desire to secure by Letters Patent—

1. An agricultural implement comprising a vehicle, a motor mounted on the vehicle, digging-tools carried on the vehicle, a rotary breaking device carried on the vehicle, and means operated by the motor for alternately operating the digging-tools and rotary breaker and moving the vehicle forward, substantially as specified.

2. An agricultural implement comprising a vehicle, a motor mounted thereon, a digging-tool mounted to swing on the vehicle, means for forcing the tool downward into the ground, a rotary breaking device rearward of the digging-tool, and means operated by the motor for alternately moving the vehicle forward and then operating the digging-tool and breaking devices, substantially as specified.

3. An agricultural implement comprising a vehicle, a motor mounted thereon, a series of digging-tools mounted on the vehicle, the said tools having vertical movement and an upward-swinging movement, means operated by the motor for causing said movements, a rotary breaker rearward of the digging-tools, and means operated by the motor for rotating said breaking-tools, substantially as specified.

4. An agricultural implement comprising a vehicle, a motor mounted thereon, a driving connection between the motor and vehicle, digging-tools carried on the vehicle, means operated by the motor for actuating said digging-tools, a rotary shaft operated from the motor, breaking tines or fingers extended outward from said shaft, and raking-tines carried by the vehicle rearward of the rotary breaking-tines, substantially as specified.

5. An agricultural implement comprising a vehicle, a motor mounted thereon, a driving connection between the motor and vehicle, digging-tools carried on the vehicle, means operated by the motor for actuating said digging-tools, a rotary shaft operated from the motor, breaking tines or fingers extended outward from said shaft, and raking-tines carried by the vehicle rearward of the rotary breaking device, the said raking-tines being extended forward, then curved rearward and downward and spirally twisted, substantially as specified.

In testimony whereof I have signed my name to this specification in the presence of two subscribing witnesses.

DAVID LUBIN.

Witnesses:
JNO. M. RITTER,
C. R. FERGUSON.